US008125476B2

(12) United States Patent
Myung et al.

(10) Patent No.: US 8,125,476 B2

(45) Date of Patent: Feb. 28, 2012

(54) ELECTRONIC DEVICE INCLUDING DISPLAY DEVICE, AND DRIVING METHOD THEREOF

(75) Inventors: Jae-Hoon Myung, Seoul (KR); Young-Joo Park, Hwaseong-si (KR); Joon-Hyun Kim, Seoul (KR); Sang-Min Lim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1084 days.

(21) Appl. No.: 11/972,806

(22) Filed: Jan. 11, 2008

(65) Prior Publication Data

US 2008/0180431 A1 Jul. 31, 2008

(30) Foreign Application Priority Data

Jan. 26, 2007 (KR) ........................ 10-2007-0008265

(51) Int. Cl.
*G06F 3/038* (2006.01)

(52) U.S. Cl. ........................................ 345/211; 345/214

(58) Field of Classification Search .............. 345/76–82, 345/87, 95, 204, 211, 212, 214, 690
See application file for complete search history.

(56) References Cited

U.S. PATENT DOCUMENTS

| | | | | |
|---|---|---|---|---|
| 6,741,239 | B2 | 5/2004 | Iwasaki | |
| 7,224,332 | B2 * | 5/2007 | Cok | 345/76 |
| 2005/0259091 | A1 * | 11/2005 | Sakamoto | 345/204 |
| 2006/0007206 | A1 * | 1/2006 | Reddy et al. | 345/204 |
| 2006/0071926 | A1 * | 4/2006 | Lee et al. | 345/211 |
| 2007/0035538 | A1 * | 2/2007 | Garcia et al. | 345/212 |
| 2007/0242005 | A1 * | 10/2007 | Hu | 345/77 |
| 2008/0122823 | A1 * | 5/2008 | Kim et al. | 345/211 |

FOREIGN PATENT DOCUMENTS

| | | | |
|---|---|---|---|
| JP | 2003-036065 | | 7/2003 |
| JP | 2004-309929 | | 11/2004 |
| JP | 2005-173143 | | 6/2005 |
| JP | 2006189714 | | 7/2006 |
| KR | 1020010091078 | A | 10/2001 |
| KR | 1020040048573 | A | 6/2004 |
| KR | 1020050008879 | A | 1/2005 |
| KR | 1020050104929 | A | 11/2005 |
| KR | 1020060072316 | A | 6/2006 |
| KR | 1020060103652 | A | 10/2006 |

* cited by examiner

*Primary Examiner* — Chanh Nguyen
*Assistant Examiner* — Pegeman Karimi
(74) *Attorney, Agent, or Firm* — F. Chau & Associates, LLC

(57) ABSTRACT

An electronic device including a display device, and a driving method thereof. The electronic device including the display device includes a central processing unit, a display device, and a feedback unit. The central processing unit provides image signals and input control signals. The display device displays an image based on the image signals and the input control signals. The feedback unit is connected between the central processing unit and the display device and transmits a signal including information on whether static electricity is applied to the display device to the central processing unit. The central processing unit initializes a driving condition when the static electricity is applied to the display device and a display operation error occurs.

21 Claims, 4 Drawing Sheets

ELECTRONIC DEVICE INCLUDING DISPLAY DEVICE, AND DRIVING METHOD THEREOF

CROSS-REFERENCE TO RELATED APPLICATION

This application claims priority to and the benefit of Korean Patent Application No. 10-2007-0008265 filed in the Korean Intellectual Property Office on Jan. 26, 2007, the entire contents of which are incorporated herein by reference.

BACKGROUND OF THE INVENTION (a) Technical Field

The present disclosure relates to an electronic device including a display device and a driver thereof.

(b) Discussion of Related Art

In recent years, as a substitute for heavy and large cathode ray tubes (CRTs), flat panel displays, such as organic light emitting diode (OLED) displays, plasma display panels (PDPs), and liquid crystal displays (LCDs) have been actively developed.

The PDPs display text or images using plasma generated by gas discharge. The organic light emitting diode displays display text or images using light emission from specific organic materials or polymers. In the liquid crystal display, an electric field is generated in a liquid crystal layer interposed between two display panels. The intensity of the electric field is adjusted to control transmittance of light that passes through the liquid crystal layer, thereby obtaining a desired image.

The flat panel display device, such as a liquid crystal display or an organic light emitting diode display, includes a display panel including pixels having switching elements and display signal lines, a gate driver that supplies gate signals to gate lines among the display signal lines so as to turn on/off the switching elements of the pixels, a gray voltage generator for generating a plurality of gray voltages, a data driver for selecting a voltage corresponding to image signals from the gray voltages as a data voltage and applying the data voltage to a data line among the display signal lines, and a signal controller for controlling the above elements.

In addition, electronic devices such as a mobile phone, a portable multimedia player (PMP), and a navigation device include the display device to display an operational state and a result of the electronic device. The electronic device usually includes a microprocessor (MPU) unit corresponding to a central processing unit, and the display device includes a driving chip for receiving image signals and control signals from the MPU to drive the display panel.

When static electricity is externally provided to the display device, an error occurs when the display device is driven and, therefore, a screen display error may be generated. Such a screen display error is acknowledged as a blackening effect in which no image is displayed on a screen. The blackening effect is generated because voltage boosting is not appropriately performed in the driving chip of the display device, and a driving voltage is not appropriately generated. The above problem is referred to as electrostatic damage (ESD).

SUMMARY OF THE INVENTION

Exemplary embodiments of the present invention have been made to provide an electronic device including a display device for maintaining a normal display state of the display device when static electricity is applied to the display device so as to not manifest static electricity damage.

An electronic device according to an exemplary embodiment of the present invention includes a central processing unit, a display device, and a feedback unit. The central processing unit provides image signals and input control signals, the display device displays an image based on the image signals and the input control signals, and the feedback unit is connected between the central processing unit and the display device and transmits a signal including information on whether static electricity is applied to the display device to the central processing unit. The central processing unit initializes a driving condition when the static electricity is applied to the display device and a display operation error occurs.

The display device may include a display panel assembly and a driving unit for driving the display panel assembly The driving unit may include a driving voltage generator, a gray voltage generator, a data driver, a gate driver, and a signal processor. The driving voltage generator generates driving voltages including first, second, and third voltages for driving the display panel assembly, the gray voltage generator generates a plurality of gray voltages based on the first voltage, and the data driver generates a data voltage based on the gray voltage and applies the data voltage to the display panel assembly. The gate driver generates a gate signal including a gate-on voltage and a gate-off voltage based on the second and third voltages and applies the gate signal to the display panel assembly, and the signal processor processes image signals to transmit output image signals to the data driver and transmit output control signals to the gate driver and the data driver based on the input control signals.

The feedback unit may include a switching element, a first resistor, and a second resistor. The switching element is connected to the central processing unit through a connection terminal, and the first resistor is connected between the switching element and the display device. The second resistor is connected to the switching element, to the first resistor, and to a ground voltage.

The switching element may include a transistor including an input terminal connected to the ground voltage, an output terminal connected to the central processing unit, and a control terminal connected to the first and second resistors.

The transistor may be an n-type transistor.

The feedback unit may further include a third resistor connected between the input terminal of the transistor and a reference power source.

A resistance ratio of the first resistor and the second resistor may be 6:1.

One of the driving voltages may be applied to the feedback unit from the display device.

The second voltage may be applied from the feedback unit to the display device.

The transistor may be turned off and a signal of a first level applied to a connection terminal of the central processing unit when the first voltage is lower than a reference value, and the transistor may be turned on and a signal of a second level applied to the connection terminal of the central processing unit when the first voltage is higher than the reference value.

The central processing unit may initialize the driving condition of the display device to perform a display operation when the signal of the first level is applied to the connection terminal of the central processing unit, and the display device may perform the normal display operation when the signal of the second level is applied to the connection terminal of the central processing unit.

The first level may be higher than the second level.

In an exemplary embodiment of a driving method of an electronic device including a central processing unit for providing image signals and input control signals and a display device for displaying an image based on the image signals and the input control signals, it is determined whether static electricity is applied to the display device, a normal display operation is appropriately performed by the display device when the static electricity is not applied to the display device, a driving condition of the display device is initialized by the central processing unit when the static electricity is applied and a display operation error occurs, and the display operation is performed again after the driving condition of the display device is initialized.

The electronic device may further include a feedback unit connected between the central processing unit and the display device. In determining whether the static electricity is applied to the display device, a signal of a first level is applied to a connection terminal for connecting the central processing unit and the feedback unit when the static electricity is applied to the display device, and a signal of a second level is applied to the connection terminal when the static electricity is not applied to the display device.

The display operation may be performed after the signal of the first level is applied to the connection terminal of the central processing unit, and the driving condition may be initialized after the signal of the second level is applied to the connection terminal of the central processing unit.

The first level may be higher than the second level.

The feedback unit may include a switching element connected to the central processing unit through a connection terminal, a first resistor connected between the switching element and the display device, and a second resistor connected to the switching element, to the first resistor, and to a ground voltage.

The switching element may include a transistor including an input terminal connected to the ground voltage, an output terminal connected to the central processing unit, and a control terminal connected to the first and second resistors.

The transistor may be an n-type transistor.

The feedback unit may further include a third resistor connected between the input terminal of the transistor and a reference power source.

A resistance ratio of the first resistor and the second resistor may be 6:1.

One of the driving voltages may be applied to the feedback unit from the display device.

BRIEF DESCRIPTION OF THE DRAWINGS

Exemplary embodiments of the present invention will be understood in more detail from the following descriptions taken in conjunction with the accompanying drawings.

DETAILED DESCRIPTION OF EXEMPLARY EMBODIMENTS

Exemplary embodiments of the present invention will be described more fully hereinafter with reference to the accompanying drawings, in which the exemplary embodiments of the invention are shown. As those of ordinary skill in the art would realize, the described exemplary embodiments may be modified in various different ways, all without departing from the spirit or scope of the present invention.

A liquid crystal display according to an exemplary embodiment of the present invention will be described with reference to the figures.

Figure 1:
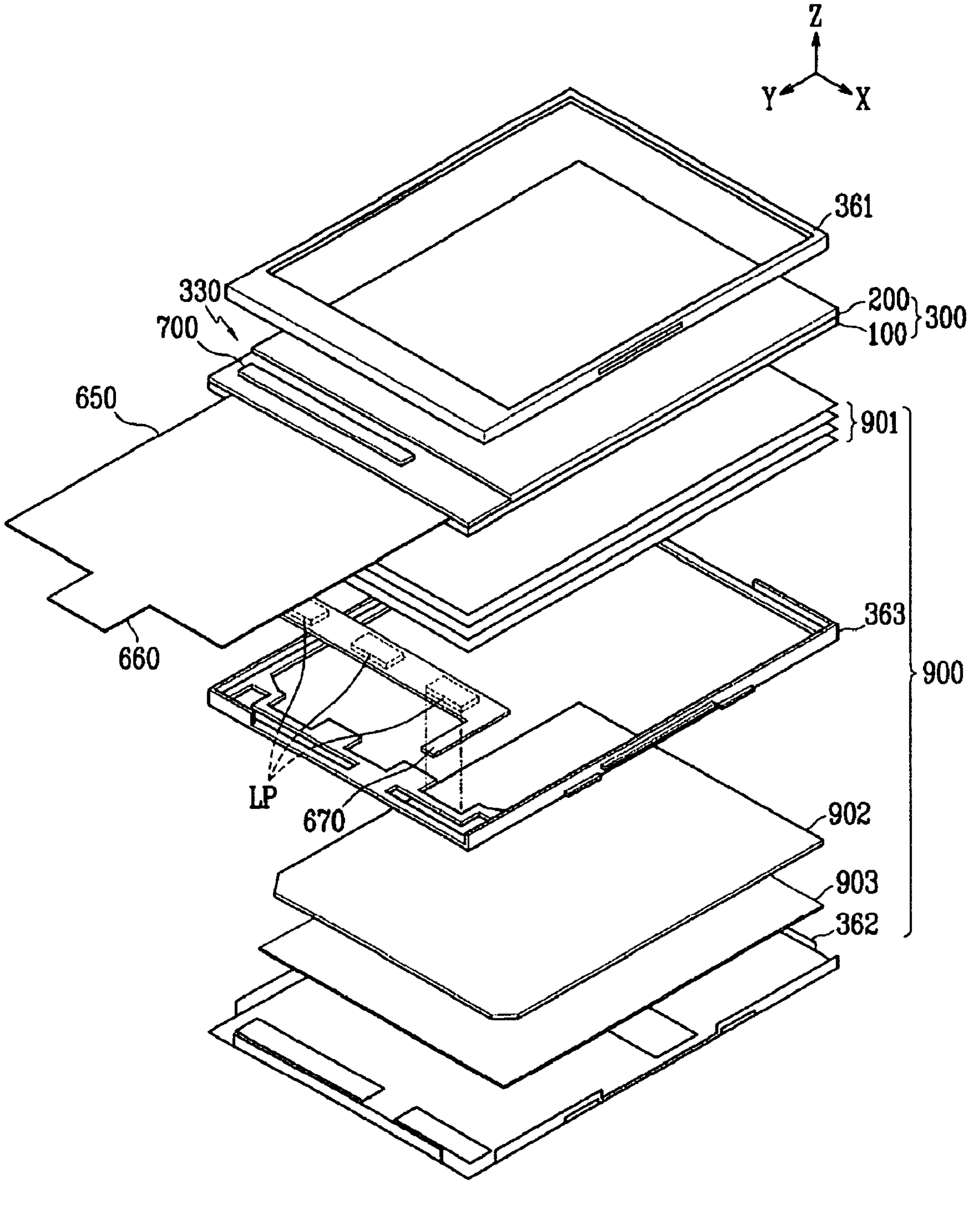
FIG. 1 is an exploded perspective view of the liquid crystal display according to an exemplary embodiment of the present invention.
Figure 2:
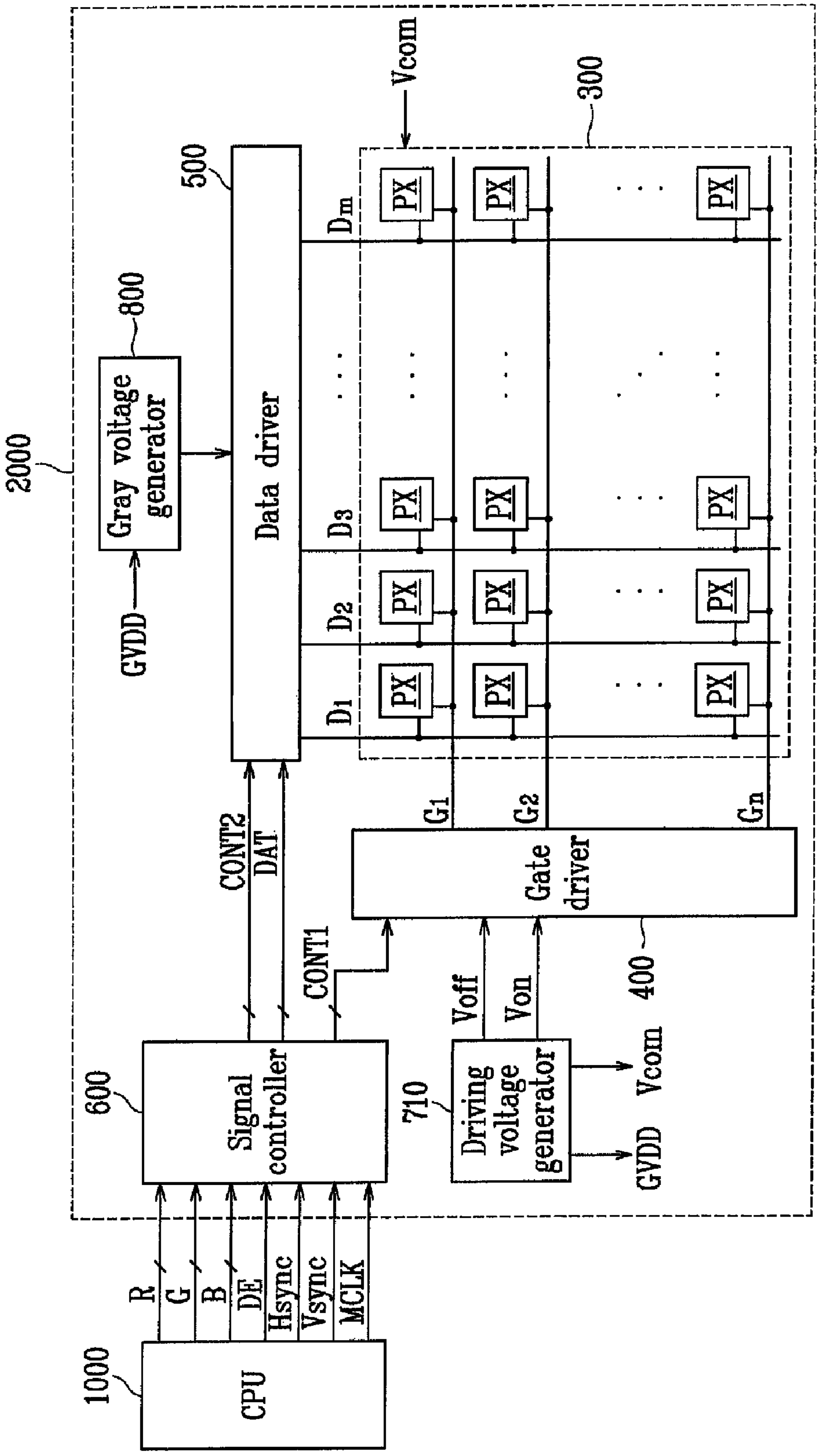
FIG. 2 is a block diagram of an electronic device according to an exemplary embodiment of the present invention.
Figure 3:
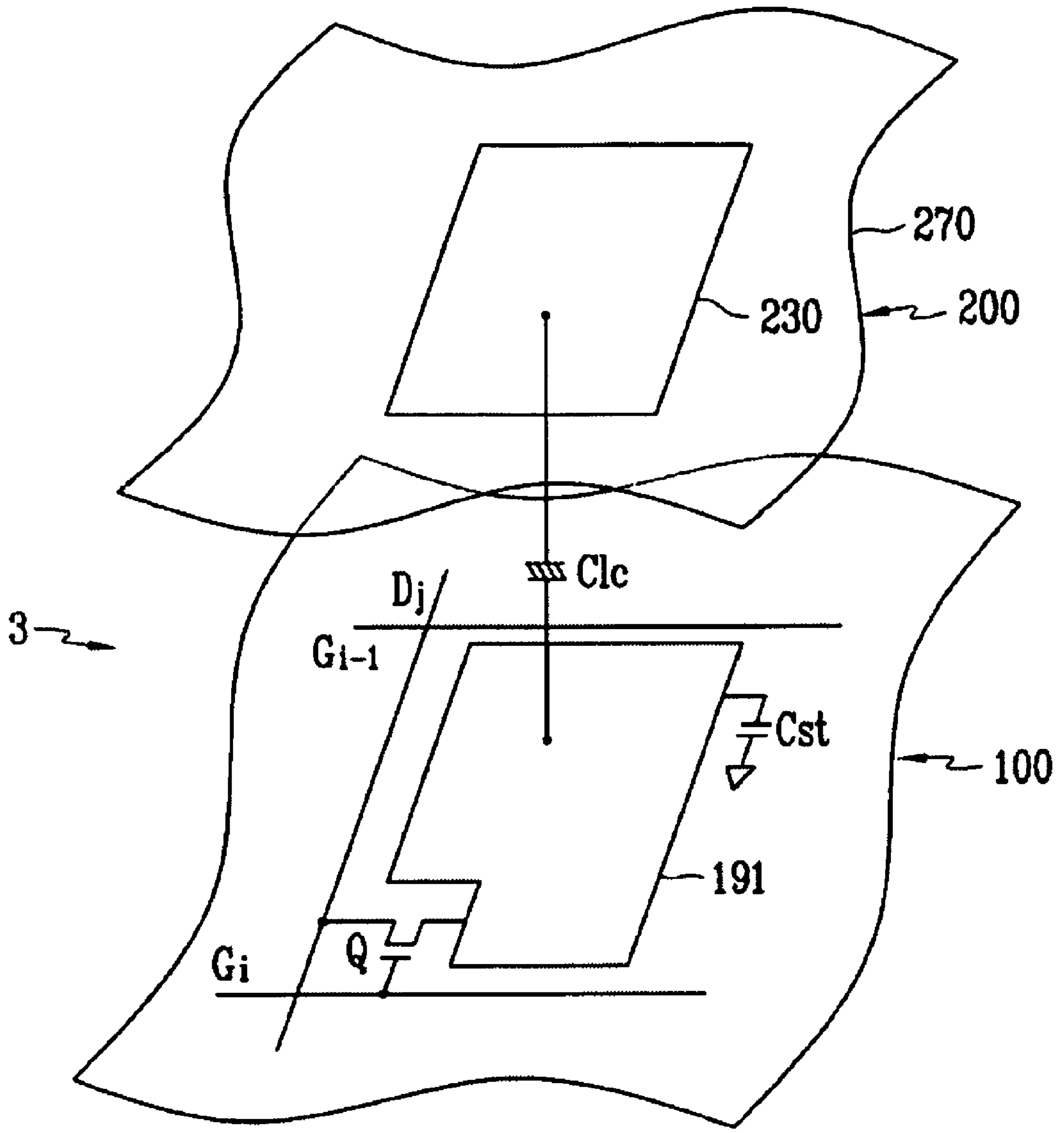
FIG. 3 is an equivalent circuit diagram of one pixel of the liquid crystal display according to an exemplary embodiment of the present invention.

FIG. 1 is an exploded perspective view of the liquid crystal display according to an exemplary embodiment of the present invention, FIG. 2 is a block diagram of an electronic device according to an exemplary embodiment of the present invention, and FIG. 3 is an equivalent circuit diagram of one pixel of the liquid crystal display according to an exemplary embodiment of the present invention.

Referring to FIG. 2, the electronic device according to an exemplary embodiment of the present invention includes a central processing unit 1000 and a display device 2000 connected to the central processing unit 1000.

The central processing unit 1000 controls an operation of the electronic device, and provides input image signals R, G, and B and control signals to the display device 2000. If the electronic device according to an exemplary embodiment of the present invention is a small or midsize device, such as a mobile phone, the central processing unit 1000 may actually be a microprocessor unit (MPU), and if the electronic device according to an exemplary embodiment of the present invention is a computer, the central processing unit 1000 may be a central processing unit (CPU).

Referring to FIG. 1, the display device of the electronic device according to an exemplary embodiment of the present invention includes a liquid crystal module including a display panel unit 330 and a back light unit 900, upper and lower chassis 361 and 362 storing the liquid crystal module, and a molded frame 363.

The display panel unit 330 includes a liquid crystal panel assembly 300, a driving chip 700 attached to the liquid crystal panel assembly 300, and a flexible printed circuit board 650.

As shown in FIG. 2 and FIG. 3, in an equivalent circuit of the liquid crystal panel assembly 300, the liquid crystal panel assembly 300 includes a plurality of signal lines and a plurality of pixels PX. In a configuration shown in FIG. 3, the liquid crystal panel assembly 300 includes lower and upper panels 100 and 200 and a liquid crystal layer 3 provided therebetween.

The signal lines are provided to the lower panel 100, and include a plurality of gate lines $G_1$ to $G_n$ for transmitting a gate signal (referred as a “scanning signal”) and a plurality of data lines $D_1$ to $D_m$ for transmitting a data voltage. The gate lines $G_1$ to $G_n$ are arranged in parallel and extend in a row direction, and the data lines $D_1$ to $D_m$ are arranged in parallel and extend in a column direction.

The pixels PX are arranged in a matrix format. Each of the pixels PX includes a switching element Q connected to the signal lines $G_i$ and $D_j$, a liquid crystal capacitor Clc connected to the switching element Q, and a storage capacitor Cst. The storage capacitor Cst may be omitted if necessary.

The switching element Q as a three terminal element, such as a thin film transistor, is provided to the lower panel 100, a control terminal thereof is connected to the gate line Gi, an input terminal thereof is connected to the data line Dj, and an output terminal is connected to the liquid crystal capacitor Clc and the storage capacitor Cst.

The liquid crystal capacitor Clc includes a pixel electrode 191 of the lower panel 100 and a common electrode 270 of the upper panel 200 as the terminals of the liquid crystal capacitor Clc, and the liquid crystal layer 3 between the two electrodes 191 and 270 acts as a dielectric material. The pixel electrode 191 is connected to the switching element Q, and the common electrode 270 is formed in a part of the upper panel 200 and receives a common voltage Vcom. Differing from what is shown in FIG. 3, the common electrode 270 may be provided to the lower panel 100. In this case, at least one of the two electrodes 191 and 270 may be formed in a line or bar shape.

An additional signal line (not shown) provided to the lower panel 100 and the pixel electrode 191 are overlapped while providing an insulator between the additional signal line and the pixel electrode 191 to form the storage capacitor Cst that acts as a subsidiary capacitor of the liquid crystal capacitor Clc, and the additional signal line receives predetermined voltages, such as the common voltage Vcom. Further, the pixel electrode 191 and a previous gate line $G_{i-i}$ are overlapped while providing the insulator between the pixel electrode 191 and a previous gate line $G_{i-1}$ to form the storage capacitor Cst.

Meanwhile, in order to perform color display, each pixel PX specifically displays one of the primary colors (spatial division), or the pixels PX alternately display the primary colors over time (temporal division), which causes the primary colors to be spatially or temporally synthesized, thereby displaying a desired color. The primary colors may include red, green, and blue. As an example of the spatial division, FIG. 3 shows that each pixel PX has a color filter 230 for displaying one of the primary colors in a region of the upper display panel 200 corresponding to the pixel electrode 191. Unlike the structure shown in FIG. 3, the color filter 230 may be provided above or below the pixel electrode 191 of the lower display panel 100.

At least one polarizer (not shown) for polarizing light is mounted on an outer surface of the liquid crystal panel assembly 300.

Referring back to FIG. 1 and FIG. 2, the driving chip 700 includes a driving voltage generator 710, a gray voltage generator 800, a gate driver 400, a data driver 500, and a signal controller 600.

The driving voltage generator 710 receives a basic voltage and boosts a voltage based on the basic voltage to generate a first voltage GVDD, a second voltage VGH (not shown), and a third voltage VGL (not shown) for driving the display device, and it generates first and second common voltages, shown as Vcom, based on the first, second, and third voltages GVDD, VGH, and VGL.

In this exemplary embodiment, various driving voltages are generated based on the first voltage GVDD, and the first voltage GVDD is input to the gray voltage generator 800 as a reference gray voltage.

The second and third voltages VGH and VGL are respectively a gate-on voltage Von for turning on the switching element Q and a gate-off voltage Voff for turning off the switching element Q, which form a gate signal.

The first and second common voltages VcomH and VcomL (not shown) are respectively a maximum value and a minimum value of the common voltage Vcom that is a periodic signal.

The gray voltage generator 800 generates all gray voltages relating to transmittance of the pixel PX or a limited number of gray voltages (hereinafter referred to as "reference gray voltages") based on the reference voltage GVDD received from the driving voltage generator 710. The reference gray voltages may include the common voltage Vcom having a positive value and the common voltage having a negative value.

The gate driver 400 is coupled to the gate lines $G_1$ to $G_n$ of the liquid crystal panel assembly 300, receives the gate-on voltage Von and the gate-off voltage Voff from the driving voltage generator 710, combines the gate-on voltage Von and the gate-off voltage Voff to generate the gate signal, and applies the gate signal to the gate lines $G_1$ and $G_n$ The data driver 500 is coupled to the data lines $D_1$ to $D_m$ of the liquid crystal panel assembly 300, selects the gray voltage received from the gray voltage generator 800, and applies it as a data voltage to the data lines $D_1$ to $D_m$. When the gray voltage generator 800 does not provide all the gray voltages but provides the limited number of reference gray voltages, however, the data driver 500 divides the reference gray voltage and selects a desired data voltage therefrom.

The signal controller 600 controls the gate driver 400 and the data driver 500.

At least one of the units 400, 500, 600, 710, and 800 or at least one circuit forming the units 400, 500, 600, 710, and 800 may be formed outside an integrated chip. In addition, the respective units 400, 500, 600, 710, and 800 may be directly mounted on the liquid crystal panel assembly 300 as at least one integrated circuit chip, they may be mounted on a flexible printed circuit film (not shown in FIG. 2) to be attached to the liquid crystal panel assembly 300 as a type of tape carrier package (TCP), or they may be mounted on an additional flexible printed circuit board (not shown in FIG. 2). Otherwise, the units 400, 500, 600, 710, and 800 may be integrated with the liquid crystal panel assembly 300 along with the signal lines $G_1$ to $G_n$ and $D_1$ to $D_m$ and the thin film transistor switching element Q.

Referring back to FIG. 1, the flexible printed circuit board 650 is mounted on one side of the liquid crystal panel assembly 300. The flexible printed circuit board 650 includes a protruding portion 660 positioned on the opposite side of the liquid crystal panel assembly 300. The protruding portion 660 receives various signals from the central processing unit 1000 of FIG. 2, and transmits them to the driving chip 700 through the flexible printed circuit board 650.

The flexible printed circuit board 650 includes a passive element unit (not shown). The passive element unit is connected to the driving voltage generator 710 of the driving chip 700 through a voltage line. The passive element unit includes a plurality of passive elements, such as a capacitor, an inductor, and a resistor, that are required to generate the driving voltage in the driving voltage generator 710.

The molded frame 363 is positioned between the upper chassis 361 and the lower chassis 362.

The backlight unit 900 includes at least one lamp (LP), a circuit element (not shown) for controlling the lamp, a printed circuit board 670, a light guide plate 902, a reflecting sheet 903, and a plurality of optical sheets 901. Three lamps LP are shown in the exemplary embodiment of FIG. 1.

The lamps LP are fixed to the printed circuit board 670 positioned on an edge area of a side of the molded frame 363, and supply light to the liquid crystal panel assembly 300.

The light guide plate 902 guides the light from the lamps LP toward the liquid crystal panel assembly 300, and causes the strength of the light to be uniform.

The reflecting sheet 903 is provided under the light guide plate 902, and reflects the light from the lamps LP to the liquid crystal panel assembly 300.

The optical sheet 901 is provided above the light guide plate 902, and secures luminescence characteristics of the light from the lamps LP.

The upper chassis 361 and the lower chassis 362 are combined with the molded frame 363 therebetween to include the liquid crystal module.

An operation of the electronic device will now be described in detail.

The central processing unit 1000 provides the input image signals R, G, and B and the input control signals to the signal controller 600.

The input image signals R, G, and B include luminance information of each pixel PX, and the luminance has a predetermined number of gray scale values, for example, 1024 (=$2^{10}$), 256 (=$2^8$), or 64 (=$2^6$).

The input control signals may include a vertical synchronization signal Vsync, a horizontal synchronization signal Hsync, a main clock signal MCLK, and a data enable signal DE.

The signal controller 600 appropriately processes the input image signals R, G, and B according to an operational condition of the liquid crystal panel assembly 300 based on the input video signals R, G, and B and the input control signals, generates gate control signals CONT1 and data control signals CONT2, transmits the gate control signals CONT1 to the gate driver 400, and transmits the data control signals CONT2 and a processed video signal DAT to the data driver 500.

The gate control signals CONT1 include a scanning start signal STV for starting a scanning operation, and at least one clock signal for controlling an output period of a gate-on voltage Von. Further, the gate control signals CONT1 may include an output enable signal OE for limiting a duration time of the gate-on voltage Von.

The data control signals CONT2 include a horizontal synchronizing start signal STH (not shown) for informing transmission start of the digital video signal DAT for a pixel PX of one row, a load signal LOAD (not shown), and a data clock signal HCLK (not shown) for applying an analog data voltage to the data lines $D_1$ to $D_m$. Further, the data control signals CONT2 may include an inversion signal RVS (not shown) for inverting data voltage polarity with respect to the common voltage Vcom, hereinafter, the data voltage polarity with respect to the common voltage Vcom will be referred to as a "data voltage polarity".

According to the data control signals CONT2 from the signal controller 600, the data driver 500 receives the digital video signal DAT for a pixel PX of one row, selects a gray voltage corresponding to each digital video signal DAT, and converts the digital video signal DAT to an analog data voltage and applies it to the corresponding data lines $D_1$ to $D_m$.

The gate driver 400 applies the gate-on voltage Von to the gate lines $G_1$ to $G_n$ according to the gate control signals CONT1 from the signal controller 600 to turn on the switching element Q coupled to the gate lines $G_1$ to $G_n$. Thereby, the data voltage applied to the data lines $D_1$ to $D_m$ is applied to the corresponding pixel PX through the turned on switching element Q.

A difference between the data voltage applied to the pixel PX and the common voltage Vcom is expressed as a charged voltage of the liquid crystal capacitor Clc, that is, a pixel voltage. The LC molecules forming the LC capacitor Clc have orientations depending on the magnitude of the pixel voltage, and the molecular orientations determine the polarization of light passing through the LC layer 3

The polarizer(s) converts the light polarization into the light transmittance such that the pixel PX has a luminance represented by a gray scale value of the data voltage.

The above-described operation is repeatedly performed having a horizontal period 1H corresponding to one period of the horizontal synchronization signal Hsync and the data enable signal DE, the gate-on voltage Von is sequentially applied to all the gate lines G1 to Gn, and the data voltage is applied to all the pixels, so as to display an image of one frame.

When the next frame starts after one frame finishes, a state of the inversion signal RVS applied to the data driver 500 to invert the polarity of the data voltage applied to each pixel PX from the polarity of a previous frame is controlled, which is reflected to as "frame inversion". In this case, in one frame, the polarity of the data voltage flowing through one data line may be periodically changed according to characteristics of the inversion signal RVS, for example, row inversion and dot inversion, or the polarities of the data voltage applied to one pixel row may be different, for example, column inversion and dot inversion.

The electronic device according to an exemplary embodiment of the present invention will now be described with reference to FIG. 4 and FIG. 5.

Figure 4:
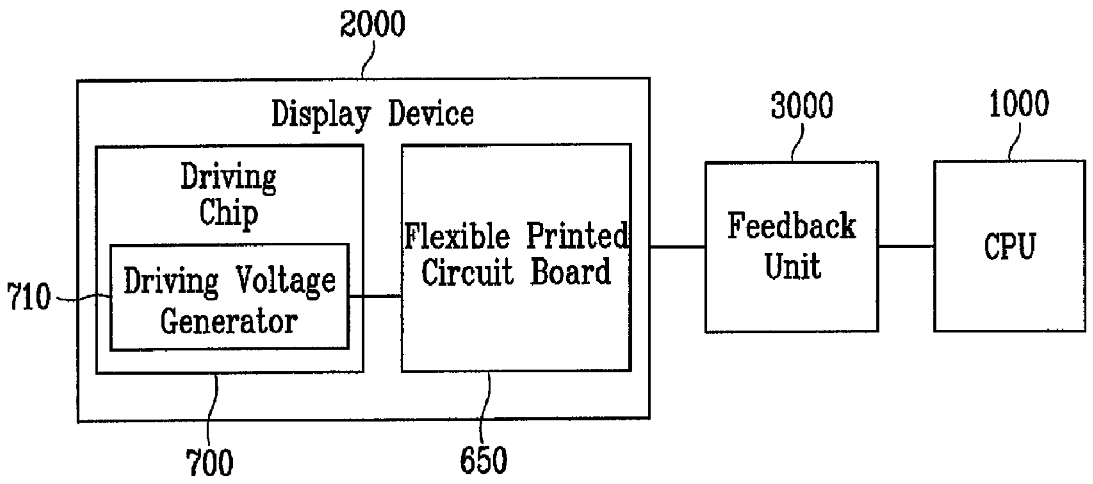
FIG. 4 is a block diagram representing a part of the electronic device according to an exemplary embodiment of the present invention.
Figure 5:
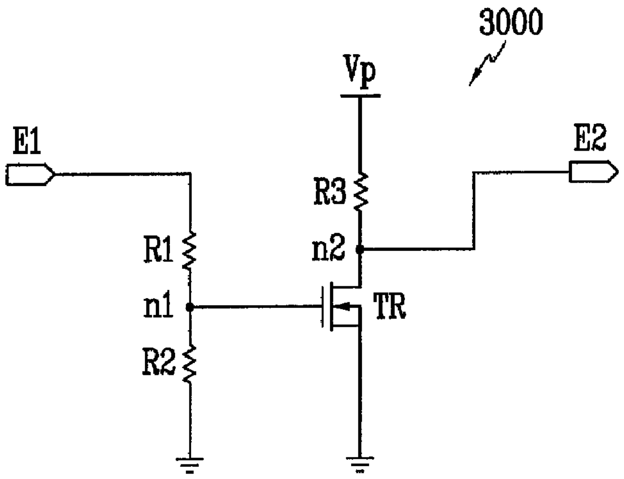
FIG. 5 is a circuit diagram representing a feedback unit in the electronic device shown in FIG. 4.

FIG. 4 is a block diagram representing a part of the electronic device according to an exemplary embodiment of the present invention, and FIG. 5 is a circuit diagram representing a feedback unit in the electronic device shown in FIG. 4.

Referring to FIG. 4, the electronic device according to an exemplary embodiment of the present invention includes the central processing unit 1000, the display device 2000, and a feedback unit 3000 connected between the central processing unit 1000 and the display device 2000.

The feedback unit 3000 transmits a signal, which includes information on whether static electricity is applied to the display device 2000, to the central processing unit 1000. Then, the central processing unit 1000 drives the display device 2000 based on the signal transmitted from the feedback unit 3000. That is, when the static electricity is not applied to the display device 2000, the central processing unit 1000 outputs the input image signals R, G, and B, and the control signals as described above. When the static electricity is applied to the display device 2000, however, a display operation of the display device 2000 is not appropriately performed. In this case, the central processing unit 1000 initializes the display operation of the display device 2000 based on the signal transmitted from the feedback unit 3000, so as to appropriately drive the display device 2000, which will be described with reference to FIG. 4 and FIG. 5.

As shown in FIG. 5, the feedback unit 3000 of the electronic device according to an exemplary embodiment of the present invention includes a first terminal E1 and a second terminal E2.

The first terminal E1 is connected to the display device 2000. More specifically, the first terminal E1 is connected to the driving voltage generator 710 of the driving chip 700 through the flexible printed circuit board 650 of the display device 2000. The first terminal E1 receives one of the driving voltages from the driving voltage generator 710, and a second voltage. VGH (not shown) that is equal to the gate-on voltage Von is applied to the first terminal E1.

The second terminal E2 is connected to the central processing unit 1000.

The feedback unit 3000 includes a transistor TR, first and second resistors R1 and R2, and a third resistor R3 coupled to the transistor TR.

The first resistor R1 is connected between the first terminal E1 and a first node n1, and the second resistor R2 is connected between the first node n1 and a ground voltage. A ratio of resistance of the respective first and second resistors R1 and R2 is 6:1. For example, the resistance of the first resistor R1 may be 180 KΩ, and that of the second resistor R2 may be 30 KΩ.

The transistor TR is an n-type transistor including an input electrode, an output electrode, and a control electrode. The input electrode of the transistor TR is connected to a second node n2 to which the third resistor R3 is connected, the output electrode is connected to the ground voltage, and the control electrode is connected to the first node n1.

In an exemplary embodiment of the present invention, while it has been described that the feedback unit 3000 includes the transistor TR, it is not limited thereto, and a switching element corresponding to the transistor TR may be used, for example, an operational amplifier (OP-amp).

The third resistor R3 is connected between a reference power source Vp and the second node n2. The third resistor R3 protects the transistor TR and may be omitted as desired.

Operations of the central processing unit 1000, the display device 2000, and the feedback unit 3000 according to an exemplary embodiment of the present invention will be described as follows.

When the static electricity is applied to the display device 2000, the driving voltage may not be appropriately boosted in the driving voltage generator 710, and therefore a desired driving voltage may not be generated. That is, the potential of each driving voltage may not be maintained at a required level, and a lower driving voltage may be output.

The second voltage VGH (not shown) that is one of the driving voltages is also not appropriately boosted, and it is input to the first terminal E1 with a level that is lower than a reference value. The second voltage VGH input to the first terminal E1 is divided according to the resistance of the first resistor R1 and the second resistor R2, so as to determine a voltage of the first node n1 and, thus, a voltage of the control electrode of the transistor TR.

When a voltage value of the first node n1 is lower than a threshold voltage of the transistor TR, the transistor TR is turned off. Accordingly, the voltage at the second node n2 is obtained by reducing the reference voltage Vp by the third resistor R3, and it is applied to the second terminal E2. The level of a signal applied to the second terminal E2 is referred to as a first level.

When the level of the signal applied to the second terminal E2 is the first level, the central processing unit 1000 detects that the static electricity is applied to the display device 2000 and an error of the display operation occurs, and initializes a driving condition of the display device 2000 so as to appropriately generate the driving voltage. Subsequently, when the display operation of the display device 2000 is performed again, the display operation error caused by the static electricity is not detected, or a time for detecting the display operation error is reduced.

When the static electricity is not applied to the display device 2000, the appropriately boosted second voltage VGH is applied to the first terminal E1. Accordingly, as described above, the second voltage VGH is divided by the resistance of the first and second resistors R1 and R2 to determine the voltage of the first node n1 and the control electrode of the transistor TR.

Because the second voltage VGH is appropriately boosted, the voltage at the control electrode of the transistor TR is higher than the threshold voltage of the transistor TR. Thereby, the transistor TR is turned on, and the voltage of the second node n2 becomes equal to the ground voltage. Accordingly, a signal having a level that is equal to the ground voltage is applied to the second terminal E2, which is referred to as a second level. The second level is lower than the first level.

Then, the central processing unit 1000 detects that the static electricity is not applied to the display device 2000, and the input image signals R, G, and B and the control signals are applied to the display device 2000 to maintain a normal display state.

That is, according to whether the level of the signal applied from the feedback unit 3000 to the central processing unit 1000 is the first level or the second level, the central processing unit 1000 determines whether the static electricity is applied to the display device 2000 and controls the display device 2000 so as not to detect the display operation error.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

Accordingly to an exemplary embodiment of the present invention, when the static electricity is applied to the display device, the static electricity is detected, and the display device is controlled to maintain the normal display state so that the static electricity damage may not be perceived.

What is claimed is:

1. An electronic device comprising:
- a central processing unit for providing image signals and input control signals;
- a display device for displaying an image based on the image signals and the input control signals; and
- a feedback unit connected between the central processing unit and the display device that transmits signals including information on whether static electricity is applied to the display device to the central processing unit, wherein the feedback unit comprises:
- a switching element connected to the central processing unit through a connection terminal;
- a first resistor connected between the switching element and the display device; and
- a second resistor connected to the switching element, to the first resistor, and to a ground voltage,
- wherein the central processing unit initializes a driving condition of the display device when the static electricity is applied to the display device and a display operation error occurs.

2. The electronic device of claim 1, wherein the display device comprises a display panel assembly and a driving unit for driving the display panel assembly.

3. The electronic device of claim 2, wherein the driving unit comprises:
- a driving voltage generator for generating driving voltages including first, second, and third voltages for driving the display panel assembly;
- a gray voltage generator for generating a plurality of gray scale voltages based on the first voltage;
- a data driver for generating a data voltage based on a respective gray scale voltage and applying the data voltage to the display panel assembly;
- a gate driver for generating a gate signal including a gate-on voltage and a gate-off voltage based on the second and third voltages and applying the gate signal to the display panel assembly; and
- a signal processor for processing image signals to transmit output image signals to the data driver, and transmitting output control signals to the gate driver and the data driver based on the input control signals.

4. The electronic device of claim 1, wherein the switching element comprises a transistor comprising an input terminal connected to the ground voltage, an output terminal connected to the central processing unit, and a control terminal connected to a node of the first and second resistors.

5. The electronic device of claim 4, wherein the transistor comprises an n-type transistor.

6. The electronic device of claim 4, wherein the feedback unit further comprises a third resistor connected between the input terminal of the transistor and a reference power source.

7. The electronic device of claim 4, wherein one of the driving voltages is applied to the feedback unit from the display device.

8. The electronic device of claim 7, wherein the second voltage is applied to the feedback unit from the display device.

9. The electronic device of claim 8, wherein the transistor is turned off and a signal of a first level is applied to a connection terminal of the central processing unit when the first voltage is lower than a reference value, and the transistor is turned on and a signal of a second level is applied to the connection terminal of the central processing unit when the first voltage is higher than the reference value.

10. The electronic device of claim 9, wherein the central processing unit initializes the driving condition of the display device to perform a display operation when the signal of the first level is applied to the connection terminal of the central processing unit, and the display device performs the normal display operation when the signal of the second level is applied to the connection terminal of the central processing unit.

11. The electronic device of claim 10, wherein the first level is higher than the second level.

12. The electronic device of claim 1, wherein a resistance ratio of the first resistor and the second resistor is 6:1.

13. A driving method of an electronic device including a central processing unit for providing image signals and input control signals, a display device for displaying an image based on the image signals and the input control signals, and a feedback unit connected between the central processing unit and the display device, the driving method comprising:

determining whether static electricity is applied to the display device;

performing a normal display operation by the display device when the static electricity is not applied to the display device;

initializing a driving condition of the display device by the central processing unit when the static electricity is applied and a display operation error occurs; and performing the normal display operation again after the driving condition of the display device is initialized, wherein the feedback unit:

connects a switching element to the central processing unit through a connection terminal;

connects a first resistor between the switching element and the display device; and connects a second resistor to the switching element, to the first resistor, and to a ground voltage.

14. The driving method of claim 13, wherein the step of determining whether the static electricity is applied to the display device comprises:

applying a signal of a first level to a connection terminal for connecting the central processing unit and the feedback unit when the static electricity is applied to the display device; and applying a signal of a second level to the connection terminal when the static electricity is not applied to the display device.

15. The driving method of claim 14, wherein the step of performing the display operation again is performed after the signal of the first level is applied to the connection terminal of the central processing unit, and the step of initializing the driving condition is performed after the signal of the second level is applied to the connection terminal of the central processing unit.

16. The driving method of claim 15, wherein the first level is higher than the second level.

17. The driving method of claim 13, wherein the switching element is provided as a transistor having an input terminal connected to the ground voltage, an output terminal connected to the central processing unit, and a control terminal connected to the first and second resistors.

18. The driving method of claim 17, wherein the transistor is provided as an n-type transistor.

19. The driving method of claim 18, wherein the feedback unit further connects a third resistor between the input terminal of the transistor and a reference power source.

20. The driving method of claim 18, wherein a resistance ratio of the first resistor and the second resistor is selected as 6:1.

21. The driving method of claim 18, wherein one of the driving voltages is applied to the feedback unit from the display device.

* * * * *